US009248512B2

(12) United States Patent
Aare (10) Patent No.: US 9,248,512 B2
(45) Date of Patent: Feb. 2, 2016

(54) ROTATABLE DRILLING TOOL AS WELL AS BASIC BODY THEREFOR

(75) Inventor: Magnus Aare, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 581 days.

(21) Appl. No.: 13/465,097

(22) Filed: May 7, 2012

(65) Prior Publication Data

US 2012/0294683 A1 Nov. 22, 2012

(30) Foreign Application Priority Data

May 16, 2011 (SE) .................................... 1150447

(51) Int. Cl.
*B23B 51/02* (2006.01)

(52) U.S. Cl.
CPC ............. *B23B 51/02* (2013.01); *B23B 2250/12* (2013.01); *B23B 2251/02* (2013.01); *B23B 2251/402* (2013.01); *Y10T 408/45* (2015.01); *Y10T 408/907* (2015.01); *Y10T 408/9095* (2015.01); *Y10T 408/9097* (2015.01)

(58) Field of Classification Search
USPC .................... 408/226, 227, 230, 231, 233
See application file for complete search history.

(56) References Cited

U.S. PATENT DOCUMENTS

| | | | | |
|---|---|---|---|---|
| 4,744,704 A | * | 5/1988 | Galvefors | ...................... 408/144 |
| 5,312,209 A | * | 5/1994 | Lindblom | ...................... 408/230 |
| 5,350,261 A | | 9/1994 | Takaya et al. | |
| 5,478,176 A | * | 12/1995 | Stedt et al. | ...................... 408/59 |
| 5,509,761 A | * | 4/1996 | Grossman et al. | ............... 408/59 |
| 5,678,960 A | * | 10/1997 | Just et al. | ....................... 408/230 |
| 5,704,740 A | * | 1/1998 | Ebenhoch et al. | ............... 408/59 |
| 8,376,669 B2 | * | 2/2013 | Jaeger et al. | ................... 408/231 |
| 2003/0175086 A1 | * | 9/2003 | Muhlfriedel et al. | .......... 408/230 |
| 2005/0084352 A1 | | 4/2005 | Borschert et al. | |
| 2005/0098359 A1 | * | 5/2005 | Lee | ............................... 175/432 |

(Continued)

FOREIGN PATENT DOCUMENTS

| | | | | |
|---|---|---|---|---|
| DE | 19605157 A1 | * | 11/1996 | ............... B23B 51/00 |
| DE | 10054850 A1 | * | 5/2002 | ............... B28D 1/14 |

(Continued)

OTHER PUBLICATIONS

European Search Report in European Application No. 12165149.1 dated Aug. 1, 2014.

*Primary Examiner* — Daniel Howell
*Assistant Examiner* — Ryan Rufo
(74) *Attorney, Agent, or Firm* — Morgan, Lewis & Bockius LLP (57) ABSTRACT

Rotatable drilling tool has an insert top detachably connectable to a basic body and at least one chip flute. In each cross-section, each chip flute has a depth equal to the difference between the radius of a cutting circle and a radius of a greatest possible core circle centered on the longitudinal axis and tangential to a limiting curve of the respective chip flute. The basic body is divided longitudinally into a coupling segment, extending axially rearward from a coupling end, and a transportation segment that is situated axially behind the coupling segment, extends rearward toward a fixing end, and is longer than the coupling segment. Each chip flute extends through the coupling segment and the transportation segment. At least essentially the entire female part is situated in the coupling segment, and each chip flute has a smaller depth in the coupling segment than in the transportation segment.

27 Claims, 7 Drawing Sheets

(56) References Cited

U.S. PATENT DOCUMENTS

| | | | |
|---|---|---|---|
| 2005/0135887 A1* | 6/2005 | Borschert et al. | 408/230 |
| 2005/0169721 A1* | 8/2005 | Schulte | 408/227 |
| 2008/0181737 A1* | 7/2008 | Limell et al. | 408/188 |
| 2008/0213053 A1 | 9/2008 | Borschert et al. | |
| 2009/0047080 A1* | 2/2009 | Schweighofer et al. | 408/59 |
| 2010/0247255 A1* | 9/2010 | Nitzsche et al. | 408/59 |
| 2011/0020086 A1 | 1/2011 | Borschert et al. | |
| 2013/0209189 A1 | 8/2013 | Borschert et al. | |

FOREIGN PATENT DOCUMENTS

| | | | |
|---|---|---|---|
| EP | 2 266 736 | 12/2010 | |
| JP | 2006-205285 A * | 8/2006 | B23B 51/00 |
| WO | WO 03/070408 | 8/2003 | |

\* cited by examiner

ROTATABLE DRILLING TOOL AS WELL AS BASIC BODY THEREFOR

RELATED APPLICATION DATA

This application is based on and claims priority under 37 U.S.C. §119 to Swedish Application No. 1150447-9, filed May 16, 2011, the entire contents of which are incorporated herein by reference.

FIELD OF THE DISCLOSURE

The present disclosure relates to a rotatable drilling tool for chip removing machining comprising a basic body and an insert top that is detachably connectable to the basic body. The present disclosure also relates to a basic body for such a rotatable drilling tool.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Rotatable drilling tools are often provided as integral tools or with replaceable or integrated cutting inserts having cutting edges, but also as a tool composed of axial parts. Such axially split tools comprise a basic body and a head that is detachably connected with the same, and thereby replaceable, and in which the cutting edges are included. In such a way, the major part of the tool can be manufactured from a comparatively inexpensive material, such as steel, while a smaller part, viz. the head, can be manufactured from a harder and more expensive material, such as cemented carbide, cermet, ceramics or the like, which gives the cutting edges good chip removing capacity, good machining precision and a long service life. In other words, the head forms a wear part, which can be discarded after wear-out, while the basic body can be re-used several times.

A drilling tool of such an axially split type is known by EP 2 266 736. In the document, a rotatable tool is disclosed, which comprises a basic body and a head that is connectable to the basic body by means of a journal projecting toward the basic body. This journal is insertable into a correspondingly formed axial recess in the end of the basic body facing the head. The head can be locked to the basic body by means of a locking screw that extends radially through the basic body and that can be brought to abut and press against a shoulder surface of the journal.

This known tool works well in many applications. However, it has turned out that there may occasionally emerge problems of cracks or in the worst case breakage in the mutually facing ends of the basic body and/or the head.

SUMMARY

Therefore, the object of the present invention is to entirely or partly obviate the above mentioned problems. This object is achieved by means of a rotatable drilling tool for chip removing machining comprising a basic body and an insert top that is detachably connectable to the basic body, wherein the insert top has an axial extension along a longitudinal axis between a front insert end having chip removing capacity and a rear coupling end, the front insert end having a cutting diameter that in an associated cross-section defines a cutting circle having the longitudinal axis as the center, wherein the basic body has an axial extension along a longitudinal axis between a front coupling end and a rear fixing end, and includes at least one chip flute, wherein the at least one chip flute extends from the front coupling end toward the rear fixing end and is formed to receive a chip removed by the front insert end and to transport the chip to the rear fixing end when the insert top is connected to the basic body, wherein in the rear coupling end, the insert top has a male part that extends axially outward from the rear coupling end, wherein in the front coupling end, the basic body has a female part that extends from the front coupling end axially inward in the basic body, which female part is formed for the receipt of the male part of the insert top when the insert top is connected to the basic body, wherein the at least one chip flute, in each cross-section along the longitudinal axis of the basic body, has a depth equal to a difference between a radius of the cutting circle and a radius of a greatest possible core circle that has the longitudinal axis as the center and that is tangent to a limiting curve of the chip flute in the cross-section, wherein the basic body is longitudinally divided into a coupling segment that extends axially rearward from the front coupling end of the basic body and into a transportation segment that is situated axially behind the coupling segment, extends rearward toward the rear fixing end of the basic body, and is longer than the coupling segment, wherein the at least one chip flute extends through the coupling segment and the transportation segment, wherein at least essentially the entire female part is situated in the coupling segment, and wherein the at least one chip flute has a smaller depth in the coupling segment than in the transportation segment. This object is also achieved by means of a basic body of such a rotatable drilling tool, wherein the basic body comprises two driver branches that extend axially outward from the coupling end and that are arranged to receive the insert top between themselves for the transfer of torque to the insert top.

According to disclosed embodiments, a rotatable drilling tool for chip removing machining comprises a basic body and an insert top that is detachably connectable to the basic body. The insert top has an axial extension along a longitudinal axis between a front insert end having chip removing capacity and a rear coupling end, which front insert end has a cutting diameter that in an associated cross-section defines a cutting circle having the longitudinal axis as the centre. The basic body has an axial extension along a longitudinal axis between a front coupling end and a rear fixing end and comprises at least one chip flute. Each at least one chip flute extends from the coupling end toward the fixing end and is formed in such a way that, when the insert top is connected to the basic body, chips that are removed by the insert end are received in some one of each at least one chip flute for the transportation to the fixing end. In its coupling end, the insert top has a male part that extends axially outward from the coupling end, and in its coupling end, the basic body has a female part that extends from the coupling end axially inward in the basic body, which female part is formed for the receipt of the male part of the insert top when the insert top is connected to the basic body. In each cross-section along the longitudinal axis of the basic body, each at least one chip flute has a depth that is equal to the difference between the radius of said cutting circle and a radius of a greatest possible core circle that has the longitudinal axis as the centre and that is tangent to a limiting curve of the respective chip flute in the cross-section in question. The basic body is divided longitudinally into a coupling segment that extends axially rearward from the coupling end of the basic body, and into a transportation segment that is situated axially behind the coupling segment, extends rearward toward the fixing end of the basic body, and is longer than the coupling segment, each at least one chip flute extending through the coupling segment and the transportation segment. At least essentially the entire female part is situated in the coupling segment and each at least one chip flute has a smaller depth in the coupling segment than in the transportation segment.

Thus, an understanding of the fact that the basic body of the drilling tool can be divided into a plurality of segments in which the chip flute is formed differently for the optimization of different properties in the respective segment forms the basis of the disclosed rotatable drilling tool. According to one embodiment, the basic body comprises a coupling segment and a transportation segment, the chip flute having a smaller depth in the coupling segment than in the transportation segment. This means that the web of the basic body becomes wider in the coupling segment than in the transportation segment. A wider web in the coupling segment allows in turn the male part of the insert top to be formed with a greater cross-section and/or the material thickness of a wall portion between the chip flute and the female part in the coupling segment to be made thicker. Simultaneously, the greater depth of the chip flute in the transportation segment, which is longer than the coupling segment, allows a better chip evacuation than what would have been possible if the chip flute in the transportation segment had had the same depth as in the coupling segment. Accordingly, there is thus a front, shorter segment of the basic body, viz. the coupling segment, formed with a shallower chip flute for obtaining a stronger coupling between the insert top and the basic body, as well as a rear, longer segment formed with a deeper chip flute for obtaining good chip evacuation.

A rotatable drilling tool according to the invention is suitable for chip removing or cutting machining of workpieces of metal, such as steel, cast iron, aluminium, titanium, yellow metals, etc. The drilling tool may also be used for the machining of composite material of different types. The drilling tool may be mounted in a machine tool that brings the tool to rotate. Usually, the tool is fed in the axial direction for the drilling of holes or boring of an existing hole in a workpiece. However, there may also be applications wherein the tool is fed in directions transverse to the axial.

The drilling tool is of the kind described by way of introduction, viz. a tool that is composed of axial parts. The drilling tool comprises a basic body and a head that is detachably connected with the same, and thereby replaceable, and is in the form of an insert top. The tool may also comprise additional axial parts, such as, for example, connection pieces or adapters for the adaptation to different machine tools.

The longitudinal axis of the tool usually coincides with the rotation axis thereof. The same applies to the axial parts included in the tool.

With the expressions "front" and "rear", reference is, in this application, made to directions along the longitudinal axis of the tool, where "front", the direction for the axial feeding direction of the insert top in machining, and "rear", the direction opposite thereto.

The insert top is the part of the tool that effects the proper machining. Usually, the insert top is precisely the top of the tool and it has usually a limited axial extension. The cutting edges of the tool are included in the insert top, wherein they may be integrated and integral with the insert top or be arranged on cutting inserts that are attached to the insert top. The insert top has often an axial length that approximately corresponds to the length that is needed to house the cutting edges, wherein the length of coupling components, which are intended for the coupling of the insert top to the basic body of the tool, may be extra.

The insert top may be provided with one or more cutting edges, which may be arranged distributed in the radial direction and/or in the circumferential direction. The cutting edges effect chip removing machining and, whenever applicable, also rubbing machining, such as grinding by, for example, the walls of the cut out hole.

When the tool is rotated around its longitudinal axis and fed only axially, the cutting edge/edges of the insert top cuts/cut out a circular hole. In the present application, the diameter of said hole is referred to by the expression "cutting diameter", and the cross-section of the hole is denominated "the cutting circle of the insert top". The cutting diameter of the insert top can also be measured by measuring the radius between the outermost point of the outermost cutting edge and the rotation axis. A circle having said radius constitutes the cutting circle.

The basic body of the tool comprises a rear fixing end, which may be shaped to fit in a machine tool or the like for the operation and feed of the tool during the machining of a workpiece. Upon machining of a workpiece, the basic body is coupled to the insert top in its front end. Thus, the basic body should be formed sufficiently stiff and strong to be capable of transferring rotation and feed from the machine tool to the insert top for the intended machining.

The basic body is also formed for the transportation of chips that have been removed from a workpiece by the insert top by being provided with chip flutes. In the machining, removed chips move through the chip flutes away from the workpiece toward the fixing end of the basic body.

The basic body may also comprise components for the transfer of torque and rotation from the basic body to the insert top such as, for instance, drivers that may abut against stop faces of the insert top.

The basic body may comprise one or more chip flutes. Usually, the basic body comprises the same number of chip flutes as the cutting edges of the insert top have in circumferentially separated positions. Thus, if the insert top comprises two cutting edges placed diametrically at the circumference of the insert top, an appurtenant basic body comprises two diametrically arranged chip flutes for the receipt and removal of chips from the respective cutting edge. However, it is also possible that chips from several cutting edges of different peripheral location are received by the same chip flute.

A chip flute in the basic body may extend helically along the basic body or essentially parallel to the longitudinal axis.

A chip flute in the basic body may comprise a curved, concave surface or a plurality of concave part surfaces. The chip flute may, in an arbitrary cross-section, have a limiting curve of a constant or varying radius of curvature. In disclosed embodiments that comprise a plurality of part surfaces, the part surfaces of a chip flute may, in an arbitrary cross-section, have the same or different curvature.

In each cross-section along the basic body, a chip flute has a depth, or, in other words, in each cross-section, the chip flute has a limiting curve that is inside the cutting circle. In this application, the depth of the chip flute is defined as the difference between the radius of the cutting circle and a radius of a greatest possible core circle. The core circle is in turn defined as the greatest circle that has the longitudinal axis as the centre and that is tangent to the limiting curve of the chip flute. In other words, the core circle is the greatest circle that, in the cross-section in question, can be drawn in with the longitudinal axis as the centre without intersecting the limiting curve of the chip flute. If the basic body according to one embodiment of the invention has two diametrically situated and symmetrical chip flutes, the diameter of this greatest core circle corresponds to the smallest web thickness of the basic body in the cross-section in question. In other embodiments, for example wherein the chip flutes are unsymmetrical or wherein the chip flutes comprise a plurality of part surfaces, said smallest web thickness may differ from the diameter of said greatest core circle.

According to the disclosed rotatable drilling tool, the insert top has a male part that projects from the coupling end of the insert top. The basic body has a female part that is complementary to an appurtenant insert top and extends axially inward from the coupling end of the basic body. According to the disclosed rotatable drilling tool, the female part has such a dimension that at least a portion of the male part can be received in the female part.

The male and female parts may be formed and placed to centre the insert top in relation to the basic body, and/or to lock, or be a part of the locking of, the insert top to the basic body.

The male part can fit in the female part with play, essentially without play, with friction, and/or under deformation of the male part and/or the female part. The male and female part may, when they are interconnected, make up, or be a part of, the locking between the insert top and the basic body. This can be realized by the male and female part together forming a friction joint. The male and female part may in addition or instead comprise shape-fixing coupling components for providing a shape-fixed coupling or locking, for example bayonet coupling.

The male part may comprise an arbitrary, suitable projecting component or components adapted to be received in one or more female parts in the form of one or more recesses, borings. The male part may comprise a projecting pin having an arbitrary cross-section, for example circular, oval, another rounded curve shape, rectangular or polygon-shaped. The female part may have the corresponding shape. The male and female part may have varying cross-sections, for example be conical. The male part may be received entirely or partly in the female part and may abut against the bottom of the female part. There may also be a gap between the male part and the bottom of the female part when the male part is received in the female part.

The male and female parts may be arranged centered on the longitudinal axes of the insert top and basic body, respectively, which advantageously gives a simpler construction. However, it is also possible that they are non-centered, but placed in such a way that the insert top and the basic body get the desired location in relation to each other when they are coupled together.

According to exemplary embodiments, the basic body is divided into a front coupling segment and a rear transportation segment. A segment corresponds to a portion of the basic body and embraces the entire radial extension of the basic body over a part of the length thereof. The basic body may also be divided into further segments.

According to exemplary embodiments, the chip flute/flutes of the basic body has/have a smaller depth in the coupling segment than in the transportation segment. In other words, a chip flute has a smaller depth at the front end of the basic body than at a distance further back. The coupling segment extends from the front end of the basic body over at least essentially the length of the entire female part. Thus, a chip flute has the smaller depth over essentially the part length of the basic body where the female part is situated. Thanks to the smaller depth of the chip flute in this segment, the greatest core circle of the chip flute becomes greater in this coupling segment than in the transportation segment where the chip flute has a greater depth. In this way, a greater space is obtained for the male and female parts of the coupling components. Compared with a known drilling tool having constant depth of the chip flute, the female part can be formed with a greater cross-section for the receipt of a male part that has been made stronger by a greater cross-section, wherein the thickness of a wall portion between the female part and the chip flute can be the same as in such a known drilling tool. It is also possible to have the same size of the cross-section of the male and female parts as in such a known drilling tool, but then obtain a thicker and thereby stronger wall portion between the chip flute and the female part. Also combinations of this are possible within the scope of the present invention.

According to exemplary embodiments, a smaller part of the female part may be positioned outside the coupling segment, wherein said part should be so small that the positive effect of improved strength in the coupling segment is not lost.

Further, a chip flute of exemplary embodiments of the drilling tool has a greater depth in the transportation segment than in the coupling segment. The greater depth in the transportation segment corresponds to such depths that chip flutes of known drilling tools normally have for functioning chip transportation. It is true that the smaller depth of the chip flute in the coupling segment implies poorer chip transportation in that segment, but since the coupling segment is situated in the front end of the drilling tool and is relatively short, the effect will be small. Accordingly, the coupling segment of the smaller depth may extend a distance past the bottom of the female part, but should be made as short as possible to affect the chip transportation as little as possible. Usually, the transportation segment extends all the way close to the fixing end of the basic body or close to a segment of the basic body that is intended for the fixing of the basic body. A chip flute has a greater portion of its length in the transportation segment than in the coupling segment.

According to exemplary embodiments, a chip flute may have a constant depth along essentially the entire coupling segment and/or the transportation segment. However, it is also possible with varying depths of the segments, however the greatest depth of the coupling segment being smaller than the smallest depth of the transportation segment.

According to one embodiment of the drilling tool, the basic body may also be divided into a segment for the fixing in a machine tool. This segment may be longer than the transportation segment, but usually the transportation segment is the longest segment of the basic body.

According to one embodiment of the invention, the basic body is also divided into a transition segment that is situated between the coupling segment and the transportation segment. In the transition segment, the depth of a chip flute is changed from the smaller depth in the coupling segment to the greater depth in the transportation segment. The transition segment may be very short, the depth being changed in a shoulder-like way or in a step. An advantage with this is that a chip flute quickly gets a depth more advantageous for the chip transportation. The transition segment may also be somewhat longer so that the depth is changed more gradually. Advantages with this are that the chip transportation becomes more even and that the chips wear less on the surface of the chip flute.

According to one embodiment of the invention, the difference between the depth of each at least one chip flute in the transportation segment and in the coupling segment is maximally 3% of the diameter of the cutting circle and/or minimally 0.5% of the diameter of the cutting circle. A greater difference gives a drill that may be too weak for certain applications. At a smaller difference, the positive effect of the combination according to the invention, with a strong coupling between the insert top and the basic body as well as good chip transportation, decreases. Preferably, the difference between the depth of each at least one chip flute in the transportation segment and in the coupling segment is maximally 2.5% of the diameter of the cutting circle and/or minimally 0.7% of the diameter of the cutting circle. Differences in depths within said interval make up an advantageous combination of good strength in the coupling segment and good transportation capacity in the transportation segment that works well for the most commonly occurring applications.

According to one embodiment of the invention, a chip flute in the coupling segment comprises two concave part surfaces that connect to each other. The two part surfaces form, in a cross-section, a curve having two valleys. The corresponding curve of a chip flute having only one concave surface has only one valley, which most often ends up near the longitudinal axis of the basic body. When a chip flute has two concave part surfaces, the valleys of the part surfaces may be located on each side of a symmetry plane through the longitudinal axis of the basic body, or in other words, one of the valleys is located in the direction of rotation, the other one in the counter direction of rotation, so that the web of the basic body becomes thicker at the longitudinal axis. In this way, with the same volume of the chip flute having the two part surfaces as of a chip flute having only one part surface, a greater maximal core circle can advantageously be accommodated. Thereby, a greater space for the male and female parts is obtained.

The corresponding effect is obtained for a chip flute having four concave part surfaces or a greater even number of part surfaces.

In such an embodiment of the invention, all chip flutes may comprise two part surfaces or only one or a few of them.

According to one embodiment of the invention, the drilling tool is provided with a duct for cooling medium. The duct is formed in such a way that the cooling medium is transported from a rear part of the basic body to the cutting edges of the insert top. The cooling duct may comprise a central duct that extends through at least the major part of the transportation segment before it deflects toward the peripheral cutting inserts of the insert top in one or more branches. In one embodiment having a plurality of chip flutes, the transportation segment may be provided with a plurality of cooling ducts that extend between the chip flutes. In embodiments wherein the chip flutes have a helix shape, also the cooling ducts may extend beside the chip flutes in a helix shape.

In such an embodiment having a central cooling duct in the transportation segment, the smallest material thickness between the central cooling duct and a chip flute in the transportation segment may be equally great or approximately equal as the smallest material thickness between the same chip flute and the female part in the coupling segment. An advantage with this is that the basic body has essentially the same strength and stiffness over both these segments, that is, over the major part of its length.

According to one embodiment of the invention, the drilling tool comprises lock means for the locking of the insert top to the basic body. The male and female part may be the entire or a part of this locking, but also other components may be included, such as a radial locking screw.

BRIEF DESCRIPTION OF THE DRAWINGS

In the following, preferred embodiments will be described in more detail by means of embodiment examples and reference being made to the accompanying, schematic drawing. In the different embodiments, the same reference designations are used for equal or corresponding components.

DETAILED DESCRIPTION OF PREFERRED EMBODIMENTS

Figure 1:
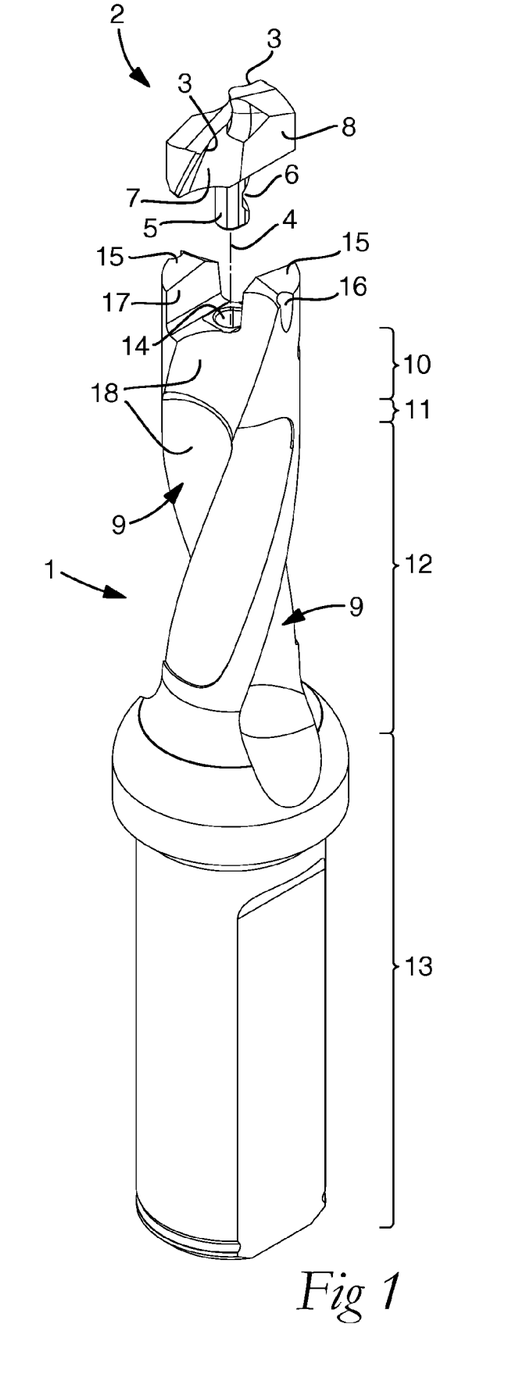
FIG. 1 shows in perspective a drilling tool according to a first embodiment of the disclosed rotatable drilling tool having the insert top separated from the basic body, the coupling segment comprising a concave surface.
Figure 2:
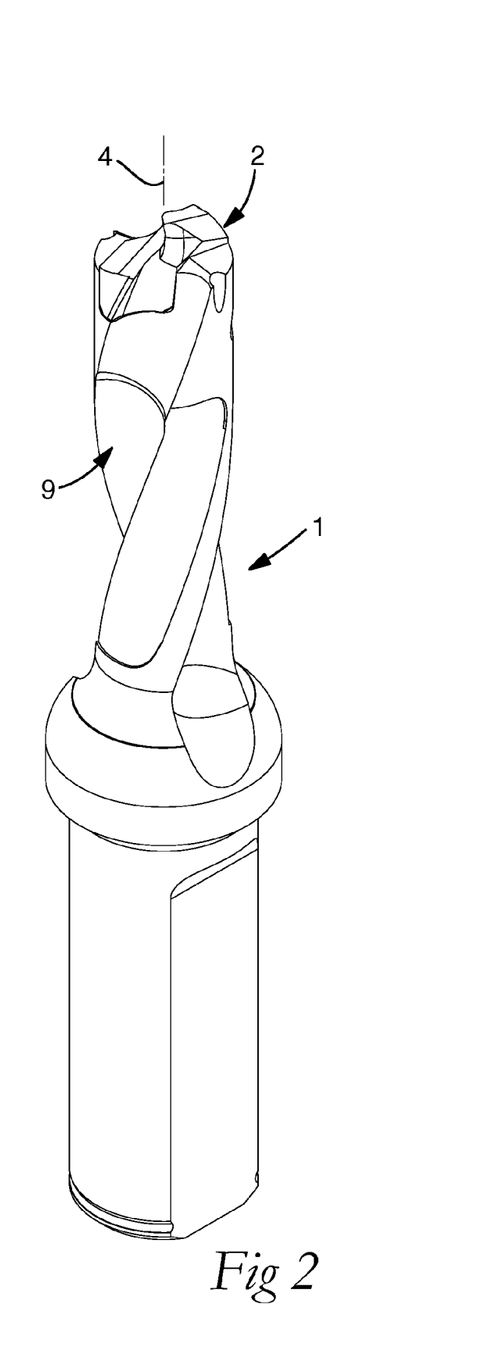
FIG. 2 shows in perspective a drilling tool according to the first embodiment of the disclosed rotatable drilling tool having the insert top mounted to the basic body.

In FIGS. 1 and 2, a rotatable drilling tool for chip removing machining is shown according to a first embodiment. The drilling tool comprises a basic body 1 and a replaceable head in the form of an insert top 2. In FIG. 1, the insert top 2 is shown separated from the basic body 1 in a detached and unmounted state, and in FIG. 2, the insert top is shown attached to the basic body 1 in a mounted state.

The insert top 2 has an axial extension between a front end, facing the workpiece during operation, and a rear coupling end. The insert top 2 has a radial extension around a longitudinal axis, which in the embodiment illustrated is a central rotation axis 4.

The insert top 1 is provided with two cutting edges 3, which are diametrically placed in the front end of the insert top. The cutting edges 3 extend from the periphery of the insert top toward the centre of the insert top. In this embodiment, the cutting edges 3 are integral with and of the same material as the insert top 2. In this embodiment, the insert top 1 is of a cemented carbide.

Next to each cutting edge 3, there is a chip space 7. The chip space 7 is formed for the receipt of chips that are formed by the appurtenant cutting edge 3 and extends axially rearward to the coupling end.

From the coupling end of the insert top 2, a male part projects in the form of an axial pin 5. The male part 5 has a drop-shaped cross-section. The male part 5 is centrally placed around the rotation axis 4. Along a portion of the outside of the male part, a stop face 6 is formed.

The insert top 2 is provided with stop faces 8. One stop face 8 extends from the outside of the insert top 2 a distance inward in the insert top where it meets a chip space 7. The chip space 7 continues outward toward the opposite outside of the insert top 2.

The basic body 1 has an axial extension between a front coupling end facing the insert top and a rear fixing end. The basic body has a radial extension around a longitudinal axis, which in the embodiment illustrated is a central rotation axis 4.

When the insert top 2 is mounted to the basic body 1, the axes of rotation 4 of the insert top 2 and basic body 1 are in line with each other so that they form a rotation axis 4 common to the tool.

In this embodiment, the basic body 1 is provided with two chip flutes 9. This is the same number of chip flutes 9 as the number of different positions of the cutting edges 3 of the insert top 2 in the circumferential direction. The number of chip flutes 9 of the basic body is also the same as the number of chip spaces 7 of the insert top 2.

The basic body 1 is divided into a coupling segment 10, a transition segment 11 situated directly axially behind the same, a transportation segment 12 situated directly axially behind the same, and an fixing segment 13 situated directly axially behind the same. The chip flutes 9 extend from the coupling end through the coupling segment 10, the transition segment 11, and the transportation segment 12, and terminate in the transportation segment 12 near the beginning of the fixing segment 13. The chip flutes 9 screw around through said segment of the basic body 1 in a helix curve.

In its coupling end, the basic body 1 has a female part in the form of an axial recess 14 for the receipt of the pin 5 of the insert top. The recess 14 extends from the coupling end axially rearward in the basic body 1. The recess 14 has a drop-shaped cross-section that resembles the one of the pin 5, the radial dimensions of the recess 14 being somewhat greater than the ones of the pin 5 so that the pin 5 can be pushed into the recess 14 with no or small friction. The female part 14 is centrally placed around the rotation axis 4.

From the coupling end of the basic body 1, two driver branches 15 project on each side of the recess 14. Each driver branch 15 is provided with a stop face 17 that extends from the periphery of the basic body 1 a distance inward in the basic body 1. In each driver branch, there is a mouth 16 for each of the branches 24 of a central cooling duct.

The fixing segment 13 of the basic body 1 is formed in a known way per se for the fixing of the drilling tool in a machine tool, not shown.

In the coupling segment 10, the two chip flutes 9 comprise each a concave limiting surface 18 that forms only one valley in the chip flute 9. Also in the transportation segment 12, the two chip flutes 9 comprise each a concave limiting surface 18 that forms only one valley in the basic body 1.

In FIGS. 1 and 2, there is also seen how the tool at the outer circumference thereof, in a known way per se, is provided with a guide pad and a behind clearance area in the transportation segment 12.

Figure 3:
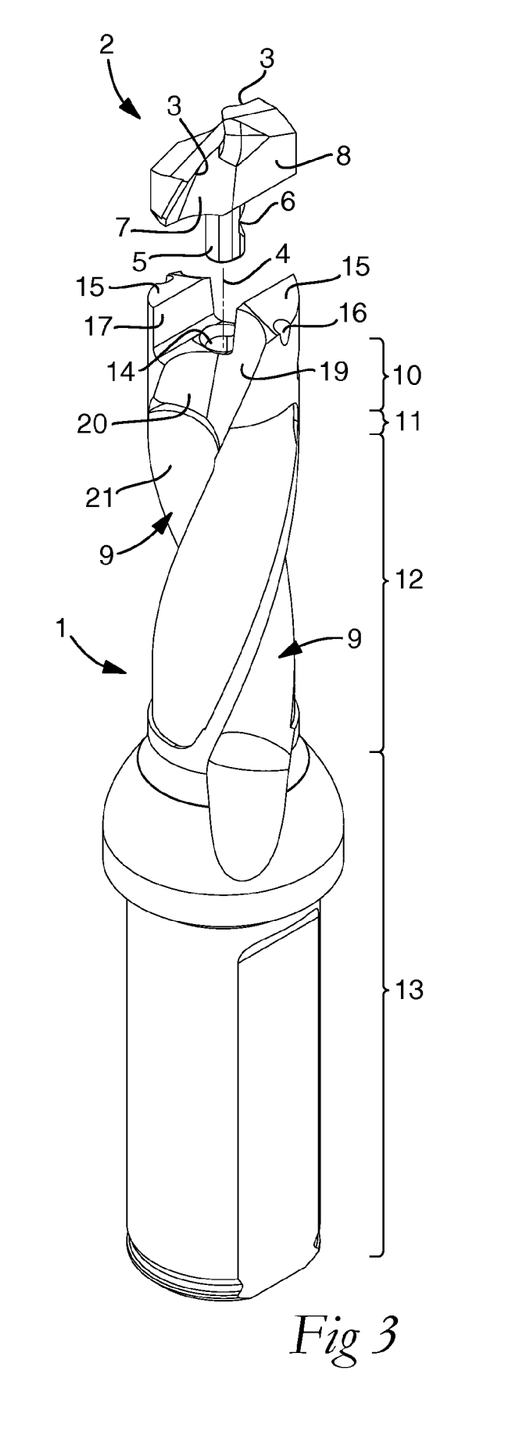
FIG. 3 shows in perspective a drilling tool according to a second embodiment of the disclosed rotatable drilling tool having the insert top separated from the basic body.
Figure 4:
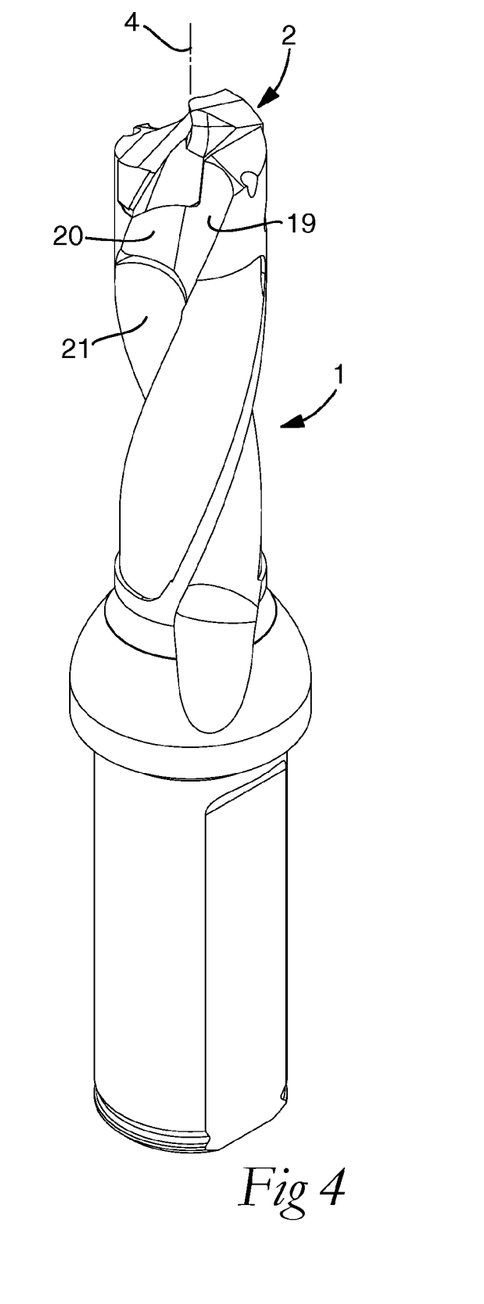
FIG. 4 shows in perspective a drilling tool according to the second embodiment of the disclosed rotatable drilling tool having the insert top mounted to the basic body.

In FIGS. 3 and 4, there is shown a second embodiment of the drilling tool, which has many features in common with the embodiment according to FIGS. 1 and 2, and therefore the description of the second embodiment is limited to differences.

In the second embodiment, the chip flutes 9 in the coupling segment comprise two part surfaces 19, 20 each. The two part surfaces 19, 20 of a chip flute 9 form each a valley in the chip flute 9. In the transportation segment 12, the two chip flutes 9 comprise each a concave limiting surface 21 that forms only one valley in the chip flute 9.

Figure 5:
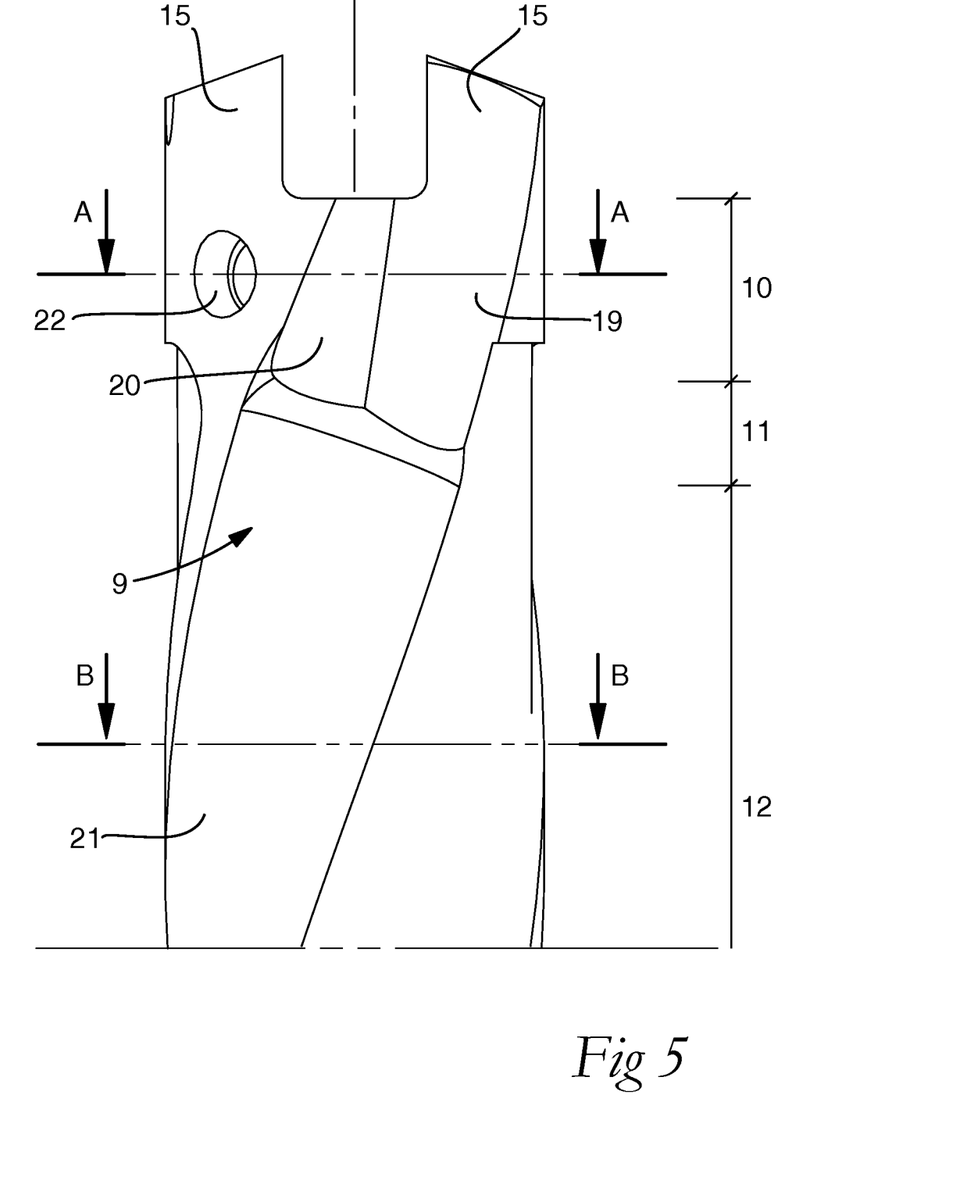
FIG. 5 shows a side view of a basic body included in a drilling tool according to the second embodiment.

In FIG. 5, there is shown an enlarged side view of the front/upper part of a basic body 1 according to the second embodiment. In the figure, there is shown the extension of the coupling segment 10 axially rearward in the basic body from the mouth of the female part 14. A front part of the transportation segment 12 extends axially rearward from a transition segment 11. The transition segment 11 extends between the coupling segment and the transportation segment 12. In the figure, there are seen the axial positions of the cross-sections that are shown in FIGS. 7A and 7B, the corresponding axial positions applying to the cross-sections according to FIGS. 6A, 6B and 8A, 8B of the first embodiment and a third embodiment, respectively.

In FIG. 5, there is seen a radial hole 22 from the outside of the basic body 1 to the female part 14 for a locking screw, not shown.

Figure 6A:
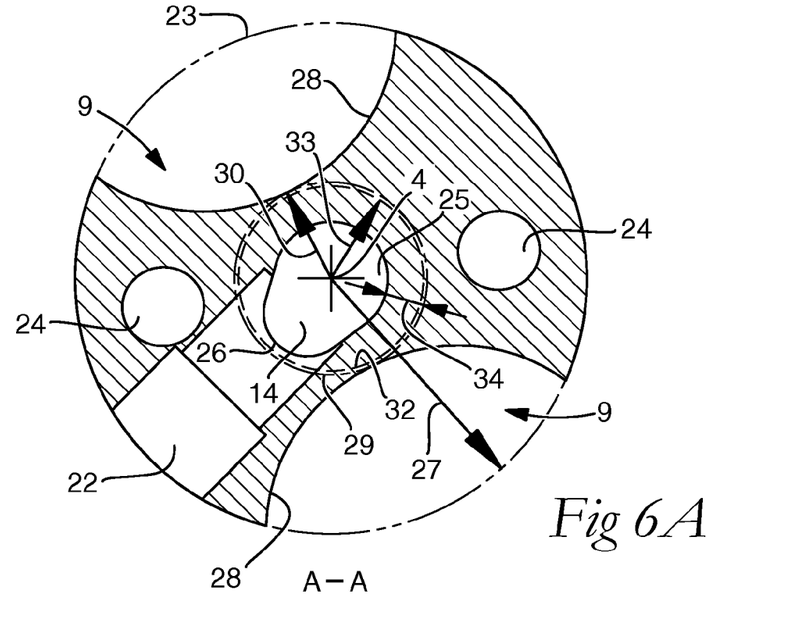
FIG. 6A shows a cross-section A-A according to FIG. 5 of a coupling segment of a basic body according to the first embodiment.
Figure 7A:
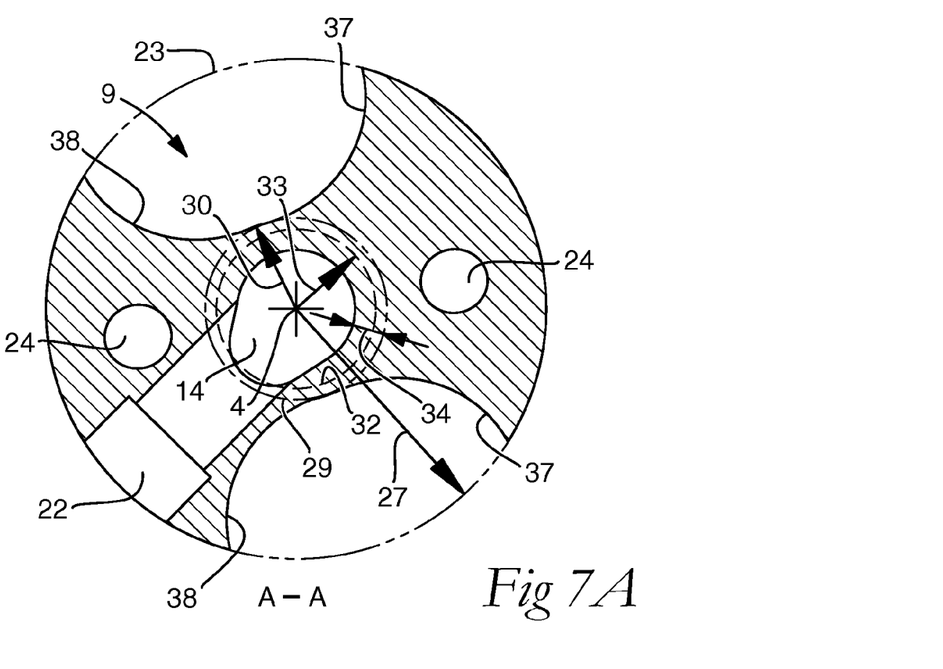
FIG. 7A shows a cross-section A-A according to FIG. 5 of a coupling segment of a basic body according to the second embodiment.
Figure 7B:
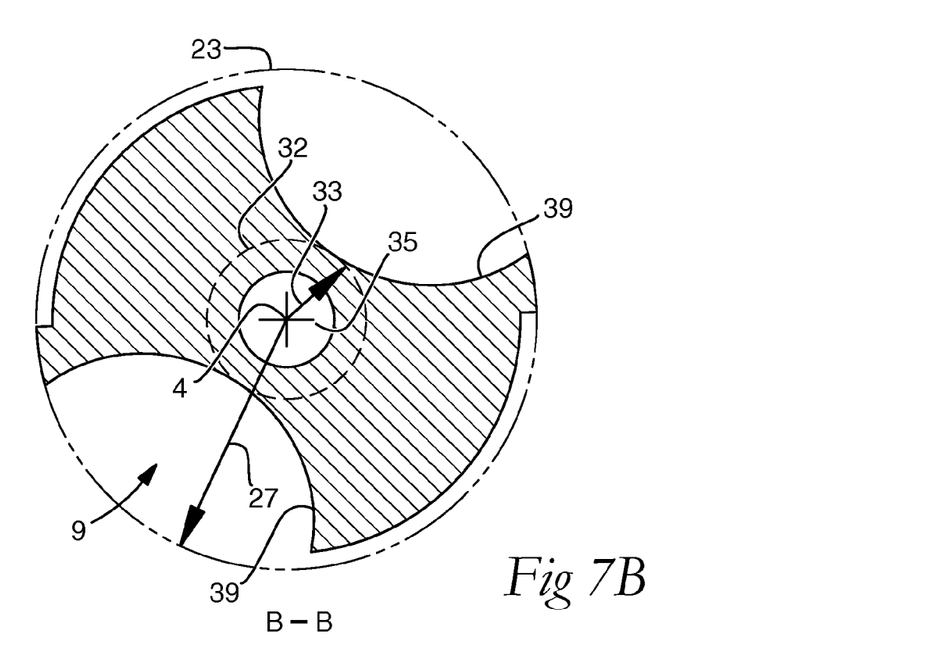
FIG. 7B shows a cross-section B-B according to FIG. 5 of a transportation segment of a basic body according to the second embodiment.

Thus, in FIG. 6A, there is shown a cross-section through the basic body according to the first embodiment that corresponds to the cross-section at A-A according to FIG. 5. This cross-section A-A is situated in the coupling segment 10. The female part 14 has a drop-shaped cross-section with the drop having a bottom 25 and a top 26. The female part 14 is centrally placed around the rotation axis 4. On each side of the female part, branches 24 of the cooling duct extend. The hole 22 mouths in the female part 14 approximately at the radial position of the top 26 of the drop.

Figure 6B:
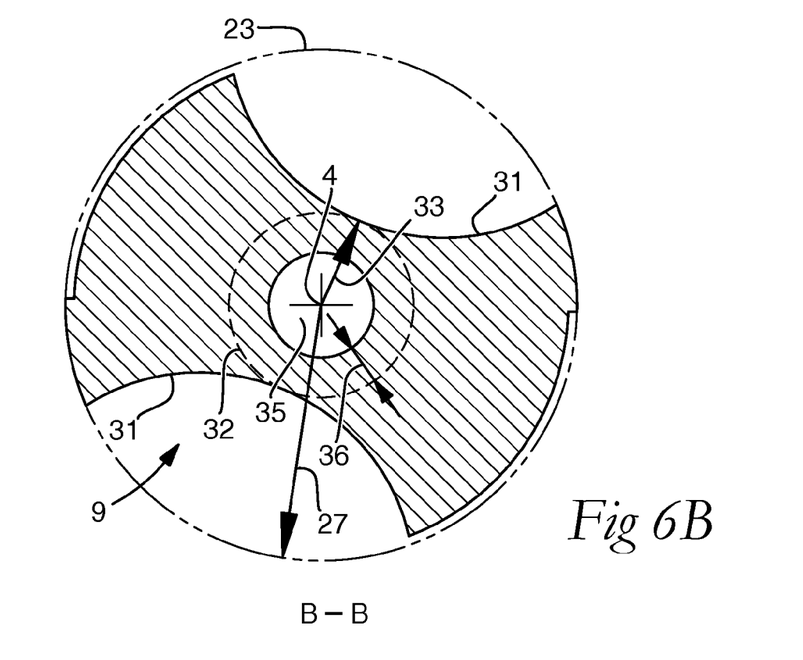
FIG. 6B shows a cross-section B-B according to FIG. 5 of a transportation segment of a basic body according to the first embodiment.

The first embodiment of the drilling tool defines a cutting circle 23, which is shown dashed in FIGS. 6A and 6B. When the tool in the machining of a workpiece is rotated around its longitudinal axis 4 and is fed only axially, the cutting edges 3 of the insert top 2 cut out a circular hole, which has the same cross-section as the cutting circle 23. The cutting circle 23 has the rotation axis 4 of the drilling tool as the centre and a radius 27.

In the first embodiment according to FIGS. 1, 2 and 6, each chip flute 9 in the coupling segment 10 comprises a concave surface the limiting curve 28 of which forms a valley. The limiting curve 28 has a constant curvature. The cross-section of the chip flutes 9 is symmetrical across a diameter in the cross-section.

A greatest possible core circle 29 that is tangent to the limiting curve 28 is shown dashed with long dashes in FIG. 6A. Since the chip flutes 9 are symmetrical, the core circle 29 is tangent to both chip flutes 9 and common to both chip flutes 9. The core circle 29 has the rotation axis 4 as the centre and a radius 30.

The difference between the radius 27 of the cutting circle 23 and the radius 30 of the core circle 29 of a chip flute 9 represents the depth of the chip flute in the cross-section A-A in question. Since the chip flutes 9 are symmetrical, they have the same depth.

In FIG. 6B, there is shown a cross-section through the basic body 1 according to the first embodiment that corresponds to the cross-section at B-B according to FIG. 5. This cross-section B-B is situated in the transportation segment 12. A central cooling medium duct 35 extends through the transportation segment 12. The cooling medium duct has a circular cross-section and the rotation axis 4 as the centre.

In the first embodiment according to FIGS. 1, 2 and 6, each chip flute 9 comprises a concave surface also in the transportation segment 12. The limiting curve 31 of the concave surface forms a valley. The limiting curve 31 has a constant curvature. The cross-section of the chip flutes 9 is symmetrical across a diameter in the cross-section.

In FIG. 6B, a greatest possible core circle 32 is shown with short dashes. Since the chip flutes 9 are symmetrical, the core circle 32 is tangent to both chip flutes 9 and common to both chip flutes 9. The core circle 32 has the rotation axis 4 as the centre and a radius 33.

The difference between the radius 27 of the cutting circle 23 and the radius 33 of the core circle 32 of a chip flute 9 represents the depth of the chip flute in the cross-section B-B in question. Since the chip flutes 9 are symmetrical, they have the same depth.

The core circle 32 and its radius 33 have also been drawn in FIG. 6A. In FIG. 6A, there is seen that the core circle 32 and its radius 33 from a cross-section in the transportation segment 12 are smaller than the core circle 29 and its radius 30 from a cross-section in the coupling segment 10. Thus, the depth of the chip flutes 9 in the cross-section B-B is greater than in the cross-section A-A. This applies to all cross-sections A-A in the coupling segment and all cross-sections B-B in the transportation segment.

Thanks to the fact that the chip flute 9 has a smaller depth in the coupling segment 10, in this segment, the web of the basic body will be thicker. A wall portion 34 between the female part 14 and a chip flute 9 may furthermore be made thicker than what would have been possible if the chip flute 9 have had the greater depth it has in the transportation segment 12, which advantageously makes the coupling segment stronger.

The chip flute 9 changes its depth from the smaller one in the coupling segment 10 to the greater one in the transportation segment 12 in a transition segment 11, cf. FIG. 5. The transition segment 11 begins where the depth of the chip flute in the coupling segment 12 begins to increase some millimeter behind the bottom of the female part 14 and terminates where the increase has reached the depth of the transportation segment 12, where the transportation segment 12 begins. Thus, in the first embodiment, the entire female part 14 is situated in the coupling segment 10.

In the first embodiment, the difference between the depth of each at least one chip flute in the transportation segment and in the coupling segment is 1% of the diameter of the cutting circle. In the first embodiment, the cutting circle has a diameter of 10 mm.

A wall 36 between the central cooling duct 35 and a chip flute 9 has approximately the same, viz. a somewhat greater, smallest thickness as the wall portion 34 between the female part 14 and the chip flute 9. In this way, the basic body obtains essentially the same strength in the transportation segment as in the coupling segment.

Figure 9:
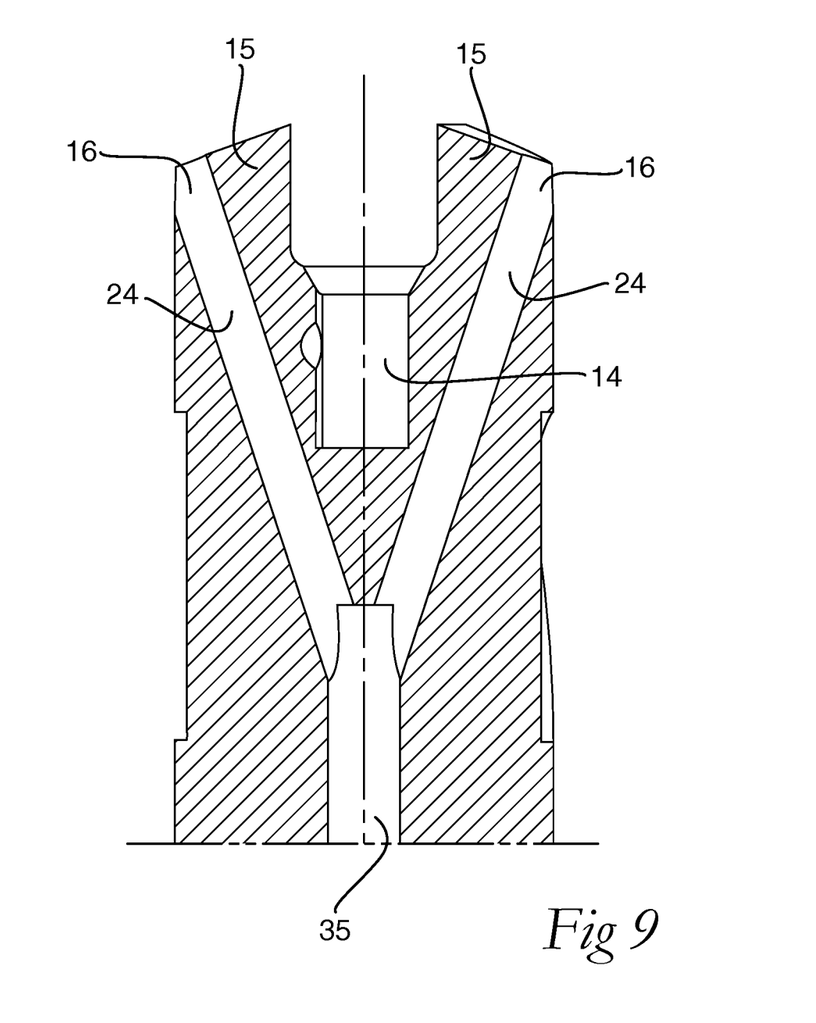
FIG. 9 shows a cross-section through a basic body according to the first embodiment.

In FIG. 9, which shows a cross-section of the basic body 1 according to the first embodiment, there is also seen the cooling duct with the central portion 35 and the two branches 24 including their mouths 16.

In FIGS. 7A and 7B, there are shown the cross-sections A-A and B-B of the second embodiment according to FIG. 5. In the second embodiment, each chip flute 9 in the coupling segment 10 comprises two concave part surfaces the limiting curves 37, 38 of which form two valleys, cf. FIG. 7A. In the transportation segment 12, each chip flute 9 comprises a concave surface having a limiting curve 39, and the cross-section B-B through the transportation segment 12 corresponds essentially to the one that the first embodiment has in the transportation segment 12 and that is shown in FIG. 6B.

In the coupling segment 10, the limiting curves 37, 38 of the two part surfaces have the same radius of curvature and the same arc length. Therefore, the two limiting curves 37, 38 meet in an area right opposite the rotation axis 4 so that one of the two valleys ends up in the direction of rotation and the other one in the counter direction of rotation. In this way, the web of the basic body 1 becomes thicker in the area right opposite the rotation axis 4 and the female part 14 in the coupling segment 10 than what is possible with a chip flute 9 according to the first embodiment having the same volume in the coupling segment 10. In this way, the greatest possible core circle 29 of the cross-section A-A becomes advantageously greater in the second embodiment than in the first one. When the two limiting curves 37, 38 meet in an area right opposite the rotation axis 4 and the female part 14, accordingly, the core circle 29 becomes maximum in this cross-section A-A.

The core circle 32 and its radius 33 in FIG. 7B have also been drawn in FIG. 7A. In FIG. 7A, there is seen that the core circle 32 and its radius 33 from a cross-section in the transportation segment 12 are smaller than the core circle 29 and its radius 30 from a cross-section in the coupling segment 10. Furthermore, in a comparison with FIG. 6A, it is seen that the difference is greater in the second embodiment than in the first one. Thus, the depth of the chip flutes 9 in the cross-section A-A is smaller in the second embodiment than in the first one.

In the second embodiment, the difference between the depth of each at least one chip flute 9 in the transportation segment and in the coupling segment is 1.5% of the diameter of the cutting circle, which in this second embodiment is 19 mm.

Thanks to the chip flute 9 of the second embodiment having a smaller depth in the coupling segment 10 than has the first embodiment, in this segment, the web of the basic body will be even thicker. A wall portion 34 between the female part 14 and a chip flute 9 may, accordingly, also be made even thicker, which advantageously makes the coupling segment 10 even stronger.

Figure 8A:
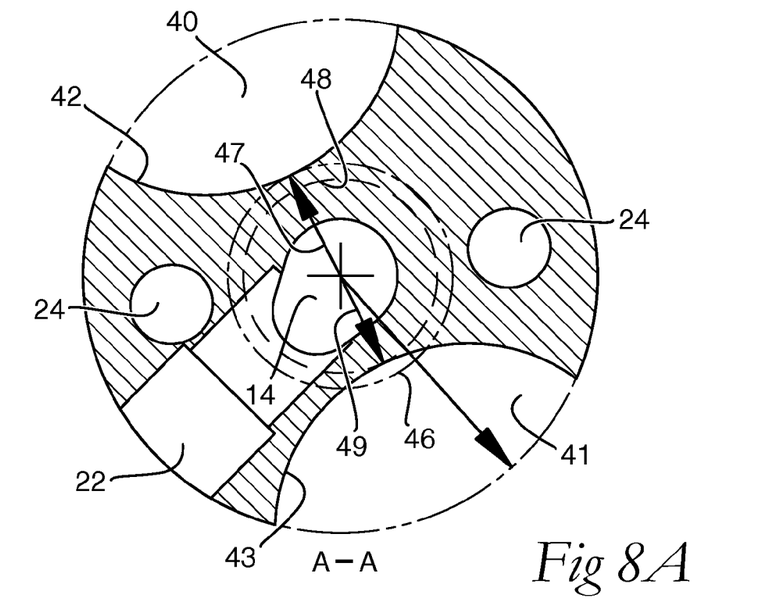
FIG. 8A shows a cross-section A-A according to FIG. 5 of a coupling segment of a basic body according to a third embodiment.
Figure 8B:
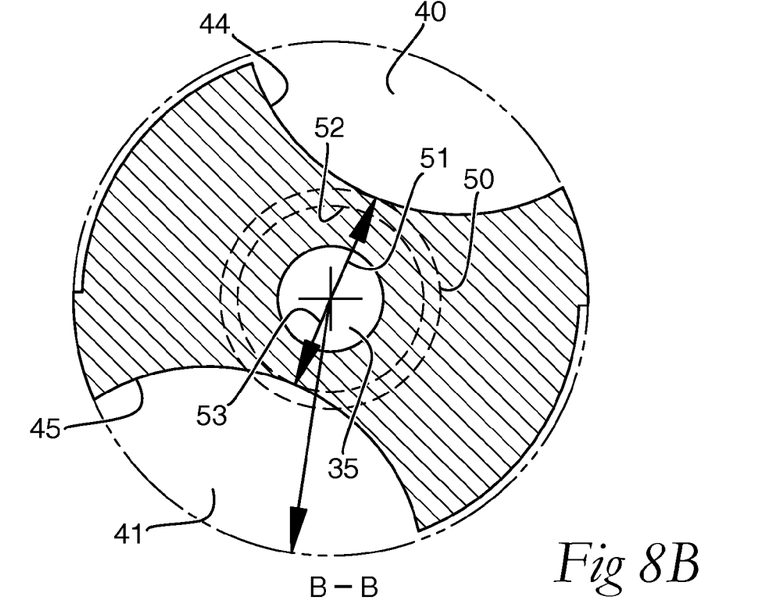
FIG. 8B shows a cross-section B-B according to FIG. 5 of a transportation segment of a basic body according to the third embodiment.

In FIGS. 8A and 8B, there is shown the corresponding cross-section through the coupling segment A-A and the transportation segment B-B of a third embodiment of the drilling tool.

The third embodiment differs from the first and the second embodiment in that it has two unsymmetrical chip flutes 40, 41. A first chip flute 40 is limited in the cross-section A-A by a limiting curve 42 and in the cross-section B-B by a limiting curve 44. A second chip flute 41 is limited in the cross-section A-A by a limiting curve 43 and in the cross-section B-B by a limiting curve 45. The chip flutes 40, 41 comprise each a surface that forms each a valley in the cross-section. The limiting curve 42 of the first chip flute 40 has a greater radius of curvature and a shorter arc length than has the limiting curve 43 of the second chip flute 41.

In the coupling segment 10, the first chip flute 40 has an associated maximal core circle 46 that is tangent to its limiting curve 42 and has the rotation axis 4 as the centre. This core circle has a radius 47. In the coupling segment 10, the second chip flute 41 has an associated maximal core circle 48 that is tangent to its limiting curve 44 and has the rotation axis 4 as the centre. This core circle has a radius 49.

Correspondingly, the chip flutes in the cross-section B-B have each a maximal core circle 50, 52 with radii 51, 53 and the rotation axis as the centre.

The core circle 46 of the first chip flute 40 in the coupling segment 10 is greater than its core circle 50 in the transportation segment 12. The same applies to the core circles 48 and 52 of the second chip flute 41. Thus, for each chip flute 40, 41, the depth in the cross-section B-B is greater than in the cross-section A-A, so that the same advantages that are described in the context of the first and the second embodiment are achieved also by the third embodiment.

The first embodiment of the drilling tool may be mounted and used in the following way.

The insert top 2 is kept above the basic body 1 with the pin 5 aligned above the recess 14. The insert top 2 is then brought between the driver branches 15 inward toward the basic body 1, the pin 5 being inserted into the recess 14 until the insert top 2 and the basic body 1 are entirely brought together. The insert top 2 is then rotated in relation to the basic body 1 so that the stop faces 8 thereof abut against stop faces 17 of the driver branches 15 of the basic body 1. Furthermore, the chip spaces 7 of the insert top 2 are situated adjacent to each a chip flute 9 so that they form a beginning of the appurtenant chip flute 9. Accordingly, the male and female parts 5, 14 in combination with the stop faces 8, 17 centre and direct the insert top 2 in correct position in relation to the basic body Next, a locking screw is inserted through the hole 22 until it abuts against a stop face 6 of the pin 5 situated in the recess 14. Finally, the locking screw is tightened for the locking of the insert top 2 in relation to the basic body.

The drilling tool according to the first embodiment mounted in this way may be mounted in a machine tool by the fixing segment 13 thereof being attached therein in a known way. During operation, the tip of the insert top 2 may be placed against a workpiece. The torque of the machine tool is transferred to the basic body, which in turn transfers the torque via the stop faces 8 of the driver branches 15 to the insert top 2 so that the tool including the insert top 2 rotates around its rotation axis 4. Then, the cutting edges 3 of the insert top will cut out chips from the workpiece. The chips are received in the chip spaces 7 and transported to the chip flutes 9.

The chips are transported through the coupling segment 10, transition segment 11 and transportation segment 12 of the basic body away from the workpiece.

It is true that the smaller depth of the chip flute 9 in the coupling segment 10 implies poorer chip transportation in this segment, but since the coupling segment is situated in the front end of the drilling tool and is relatively short, the effect will be small. Simultaneously, the smaller depth of the chip flute 9 in the coupling segment allows a strong coupling between the insert top 2 and basic body 1. In the longer transportation segment 12, the chip flute has a greater depth so that the removal of chips from the workpiece works well.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. Rotatable drilling tool for chip removing machining comprising:
   a basic body; and
   an insert top that is detachably connectable to the basic body,
   wherein the insert top extends axially along a longitudinal axis between a front insert end having chip removing capacity and a rear coupling end, the front insert end having a cutting diameter that in an associated cross-section defines a cutting circle having the longitudinal axis as the center,
   wherein the basic body extends axially along a longitudinal axis between a front coupling end and a rear fixing end, and includes at least one chip flute,
   wherein each chip flute extends from the front coupling end toward the rear fixing end and is formed to receive a chip removed by the front insert end and to transport the chip to the rear fixing end when the insert top is connected to the basic body,
   wherein in the rear coupling end, the insert top has a male part that extends axially outward from the rear coupling end,
   wherein in the front coupling end, the basic body has a female part that extends from the front coupling end axially inward in the basic body, which female part is formed for the receipt of the male part of the insert top when the insert top is connected to the basic body,
   wherein the basic body comprises a wall portion between the female part and each at least one chip flute,
   wherein each chip flute, in each cross-section along the longitudinal axis of the basic body, has a depth, the depth in each cross-section is equal to a difference between a radius of the cutting circle and a radius of a greatest possible core circle that has the longitudinal axis as the center and that is tangent to a limiting curve of the chip flute in the cross-section,
   wherein the basic body is longitudinally divided into a coupling segment that extends axially rearward from the front coupling end of the basic body and into a transportation segment that is situated axially behind the coupling segment, and the transportation segment extends rearward toward the rear fixing end of the basic body and is longer than the coupling segment,
   wherein each chip flute extends through the coupling segment and the transportation segment,
   wherein the entire female part is situated in the coupling segment,
   wherein each chip flute has a smaller depth in the coupling segment than in the transportation segment, and
   wherein, for each chip flute, each cross-section along the axial length of the coupling segment has the same depth.

2. Rotatable drilling tool according to claim 1, wherein the maximum difference between the depth of each chip flute in the transportation segment and in the coupling segment is 3% of the cutting diameter of the cutting circle.

3. Rotatable drilling tool according to claim 2, wherein the minimal difference between the depth of each chip flute in the transportation segment and in the coupling segment is 0.5% of the cutting diameter of the cutting circle.

4. Rotatable drilling tool according to claim 1, wherein the minimal difference between the depth of each one chip flute in the transportation segment and in the coupling segment is 0.5% of the cutting diameter of the cutting circle.

5. Rotatable drilling tool according to claim 1, wherein the at least one chip flute in the coupling segment comprises a first concave surface that connects to a second concave surface in such a way that two valleys are formed in the at least one chip flute.

6. Rotatable drilling tool according to claim 5, wherein, in each cross-section transverse to the female part in the coupling segment, the first concave surface connects to the second concave surface in an area that is situated so that the core circle becomes maximal.

7. Rotatable drilling tool according to claim 6, wherein, in each cross-section transverse to the female part in the coupling segment, the first concave surface has a first curvature as well as a first arc length, and the second concave surface has a second curvature and a second arc length, wherein the first curvature is equal to the second curvature, and wherein a length of the first arc length is equally to a length of the second arc length.

8. Rotatable drilling tool according to claim 1, wherein the at least one chip flute in the transportation segment comprises only one concave surface.

9. Rotatable drilling tool according to claim 1, wherein the basic body comprises a cooling duct that in the transportation segment includes a central duct,
wherein a wall portion between the at least one chip flute and the central duct in the transportation segment has a first smallest thickness and the wall portion between the at least one chip flute and the female part in the coupling segment has a second smallest thickness, and
wherein the first smallest thickness is equal to the second smallest thickness.

10. Rotatable drilling tool according to claim 1, wherein the male part comprises a central, cylindrical pin and the female part a central, cylindrical recess.

11. Rotatable drilling tool according to claim 1, wherein the male part comprises a central pin having a first radial cross-sectional shape that includes two wedge-shaped converging linear surfaces connected by two curved surfaces of different curvature,
wherein the female part comprises a central recess having a radial second cross-sectional shape that includes two non-parallel linear surfaces connected by two curved surfaces of different curvature, and
wherein radial dimensions of the central recess are greater than radial dimensions of the central pin.

12. Rotatable drilling tool according to claim 1, wherein the basic body comprises two chip flutes that in the longitudinal direction extend in a helix shape and wherein, in each cross-section, the two chip flutes have the same depth.

13. Rotatable drilling tool according to claim 1, wherein the basic body comprises two driver branches that extend axially outward from the coupling end and that are arranged to receive the insert top between themselves for the transfer of torque to the insert top.

14. Rotatable drilling tool according to claim 1, wherein the coupling segment comprises a locking screw that from the outside of the coupling segment is actuatable to press against a contact surface of the male part when the insert top is connected to the basic body.

15. Basic body for a rotatable drilling tool for chip removing machining, comprising:
a body portion that extends axially along a longitudinal axis between a front coupling end and a rear fixing end; and
at least one chip flute in the body portion,
wherein each chip flute extends from the front coupling end toward the rear fixing end and is formed to receive a chip and to transport the chip to the rear fixing end,
wherein in the front coupling end, the body portion has a female part that extends from the front coupling end axially inward in the body portion, which female part is formed for receipt of a male part of an insert top when the insert top is connected to the body portion,
wherein the basic body comprises a wall portion between the female part and each at least one chip flute,
wherein each chip flute, in each cross-section along the longitudinal axis of the body portion, has a depth, and the depth in each cross-section is equal to a difference between a radius of the cutting circle and a radius of a greatest possible core circle that has the longitudinal axis as the center and that is tangent to a limiting curve of the chip flute in the cross-section,
wherein the body portion is longitudinally divided into a coupling segment that extends axially rearward from the front coupling end of the body portion and into a transportation segment that is situated axially behind the coupling segment, and the transportation segment extends rearward toward the rear fixing end of the body portion and that is longer than the coupling segment,
wherein each chip flute extends through the coupling segment and the transportation segment,
wherein the entire female part is situated in the coupling segment,
wherein each chip flute has a smaller depth in the coupling segment than in the transportation segment, and
wherein, for each chip flute, each cross-section along the axial length of the coupling segment has the same depth.

16. Rotatable drilling tool for chip removing machining comprising:
a basic body; and
an insert top that is detachably connectable to the basic body,
wherein the insert top extends axially along a longitudinal axis between a front insert end having chip removing capacity and a rear coupling end, the front insert end having a cutting diameter that in an associated cross-section defines a cutting circle having the longitudinal axis as the center,
wherein the basic body extends axially along a longitudinal axis between a front coupling end and a rear fixing end, and includes at least one chip flute,
wherein the at least one chip flute extends from the front coupling end toward the rear fixing end and is formed to receive a chip removed by the front insert end and to transport the chip to the rear fixing end when the insert top is connected to the basic body,
wherein in the rear coupling end, the insert top has a male part that extends axially outward from the rear coupling end,
wherein in the front coupling end, the basic body has a female part that extends from the front coupling end axially inward in the basic body, which female part is formed for the receipt of the male part of the insert top when the insert top is connected to the basic body,
wherein the basic body comprises a wall portion between the female part and each at least one chip flute,
wherein the at least one chip flute, in each cross-section along the longitudinal axis of the basic body, has a depth, the depth in each cross-section equal to a difference between a radius of the cutting circle and a radius of a greatest possible core circle that has the longitudinal axis as the center and that is tangent to a limiting curve of the chip flute in the cross-section,
wherein the basic body is longitudinally divided into a coupling segment that extends axially rearward from the front coupling end of the basic body and into a transportation segment that is situated axially behind the coupling segment, and the transportation segment that extends rearward toward the rear fixing end of the basic body and that is longer than the coupling segment,
wherein the at least one chip flute extends through the coupling segment and the transportation segment,
wherein the entire female part is situated in the coupling segment,
wherein the at least one chip flute has a smaller depth in the coupling segment than in the transportation segment, and
wherein each cross-section of the at least one chip flute along the axial length of the coupling segment has the same depth.

17. Rotatable drilling tool according to claim 16, wherein the maximum difference between the depth of the at least one chip flute in the transportation segment and in the coupling segment is 3% of the cutting diameter of the cutting circle.

18. Rotatable drilling tool according to claim 17, wherein the minimal difference between the depth of the at least one chip flute in the transportation segment and in the coupling segment is 0.5% of the cutting diameter of the cutting circle.

19. Basic body for a rotatable drilling tool for chip removing machining, comprising:
- a body portion that extends axially along a longitudinal axis between a front coupling end and a rear fixing end; and
- at least one chip flute in the body portion,
- wherein the at least one chip flute extends from the front coupling end toward the rear fixing end and is formed to receive a chip and to transport the chip to the rear fixing end,
- wherein in the front coupling end, the body portion has a female part that extends from the front coupling end axially inward in the body portion, which female part is formed for the receipt of the male part of an insert top when the insert top is connected to the body portion,
- wherein the basic body comprises a wall portion between the female part and each at least one chip flute,
- wherein the at least one chip flute, in each cross-section along the longitudinal axis of the basic body, has a depth, and the depth in each cross-section equal to a difference between a radius of the cutting circle and a radius of a greatest possible core circle that has the longitudinal axis as the center and that is tangent to a limiting curve of the chip flute in the cross-section,
- wherein the body portion is longitudinally divided into a coupling segment that extends axially rearward from the front coupling end of the body portion and into a transportation segment that is situated axially behind the coupling segment, and the transportation segment extends rearward toward the rear fixing end of the body portion and is longer than the coupling segment,
- wherein the at least one chip flute extends through the coupling segment and the transportation segment,
- wherein the entire female part is situated in the coupling segment,
- wherein the at least one chip flute has a smaller depth in the coupling segment than in the transportation segment, and
- wherein each cross-section of the at least one chip flute along the axial length of the coupling segment has the same depth.

20. Basic body for a rotatable drilling tool for chip removing machining according to claim 19, wherein each cross-section of the at least one chip flute along the axial length of the transportation segment has the same depth.

21. Basic body for a rotatable drilling tool for chip removing machining according to claim 20, wherein the body portion includes a transition segment situated between the coupling segment and the transportation segment and, in the transition segment, the depth of the at least one chip flute changes from a smaller depth in the coupling segment to a greater depth in the transportation segment.

22. Rotatable drilling tool according to claim 1, wherein, for each chip flute, each cross-section along the axial length of the transportation segment has the same depth.

23. Rotatable drilling tool according to claim 22, wherein the basic body includes a transition segment situated between the coupling segment and the transportation segment and, in the transition segment, the depth of each chip flute changes from a smaller depth in the coupling segment to a greater depth in the transportation segment.

24. Basic body for a rotatable drilling tool for chip removing machining according to claim 15, wherein, for each chip flute, each cross-section along the axial length of the transportation segment has the same depth.

25. Basic body for a rotatable drilling tool for chip removing machining according to claim 24, wherein the basic body includes a transition segment situated between the coupling segment and the transportation segment and, in the transition segment, the depth of each chip flute changes from a smaller depth in the coupling segment to a greater depth in the transportation segment.

26. Rotatable drilling tool according to claim 16, wherein each cross-section of the at least one chip flute along the axial length of the transportation segment has the same depth.

27. Rotatable drilling tool according to claim 26, wherein the basic body includes a transition segment situated between the coupling segment and the transportation segment and, in the transition segment, the depth of the at least one chip flute changes from a smaller depth in the coupling segment to a greater depth in the transportation segment.

* * * * *